Aug. 25, 1959
R. L. AITKEN
2,901,106
APPARATUS FOR SORTING TIMBER
Filed March 10, 1958
2 Sheets-Sheet 2
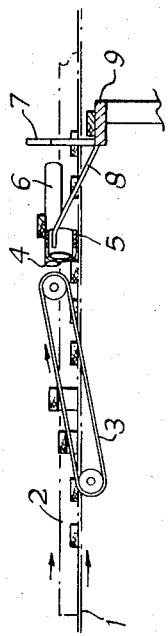
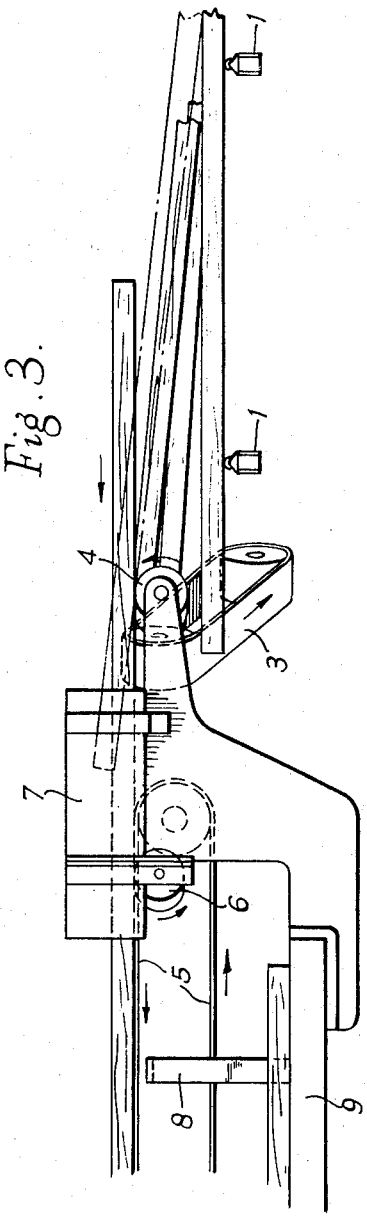
Robert L. AITKEN
INVENTOR
BY
Wenderoth, Lind & Ponack
ATTORNEYS United States Patent Office 2,901,106
Patented Aug. 25, 1959

2,901,106

APPARATUS FOR SORTING TIMBER

Robert Loudon Aitken, London, England

Application March 10, 1958, Serial No. 720,142

Claims priority, application Great Britain
March 15, 1957

6 Claims. (Cl. 209—103)

The present invention relates to apparatus for sorting timber according to length, although it may also be employed for the semi-automatic removal of planks to sort out planks of an inferior or superior quality from a mass of planks or baulks carried on a conveyor.

In order to sort out the planks into the variety of lengths which are encountered in the planks supplied to the timber trade, it is desirable to provide means for sorting timber into separate sets having a small difference in length between the different sets.

According to the present invention an apparatus for sorting planks comprises a main conveyor on which the planks are carried breadthwise and ejecting means arranged beside the main conveyor the ejecting means comprising a means for engaging and raising the end of those planks on the main conveyor which, on arrival at the ejecting means, project laterally from the main conveyor by more than a predetermined amount, and a lateral conveying means arranged at a higher level than the main conveyor and positioned to receive the raised end of a plank from the engaging and raising means and to move such plank laterally of the main conveyor, said lateral conveying means being arranged to give the plank a component of motion lengthwise of the main conveyor substantially equal to the speed of the main conveyor.

When the apparatus is used for quality sorting purposes the ejecting means is placed at a position where it would not ordinarily engage any of the planks carried on the conveyor. Those planks which it is desired to remove for quality sorting purposes are moved laterally of the conveyor by hand or by mechanical means under the control of an operator.

When the apparatus is used as a means for sorting planks according to length, a guide means is provided to engage against one end of the planks on the main conveyor and a plurality of ejecting means are arranged beside the main conveyor at a plurality of spaced stations, the gap between the means for engaging and raising the ends of the planks and the guide means decreasing at each successive station, so that the planks automatically ejected at each successive station becomes shorter. It follows that at each station there will be ejected planks ranging in length from those which were just too short to be removed at the preceding station to those which are only just long enough to be removed at the present station.

The main conveyor used in apparatus made in accordance with the present invention will ordinarily comprise a number of parallel chains spaced about two feet or more apart and arranged on suitable guides so as to run substantially horizontal. Boards or planks are placed on to this conveyor by stacking mechanism of known design so that they extend breadthwise of the conveyor and are spaced apart by a distance of for example 6 inches.

The links of the chains of which the main conveyor is composed carry rollers whose axes lie along the length of the chain and this facilitates the movement of boards laterally of the chains. With this type of chain conveyor there is some tendency for the planks to slide lengthwise of the conveyor chains if the planks are subjected to any appreciable resistance to forward movement.

An alternative type of conveyor that may be employed has cleats for positive engagement of the planks for forward movement and idler rolls are arranged between the chains on the conveyor table with their axes extending lengthwise of the table to assist the lateral removal of planks from the conveyor.

Many of the details of the machine are governed by the type of chain employed in the construction of the main conveyor.

One form of timber sorting apparatus made in accordance with the present invention is hereinafter described with reference to the accompanying drawings wherein:

Figure 2 is a section on line A—A of Figure 1.

Figure 3 is an end view on an enlarged scale of the ejecting means.

Figure 1:
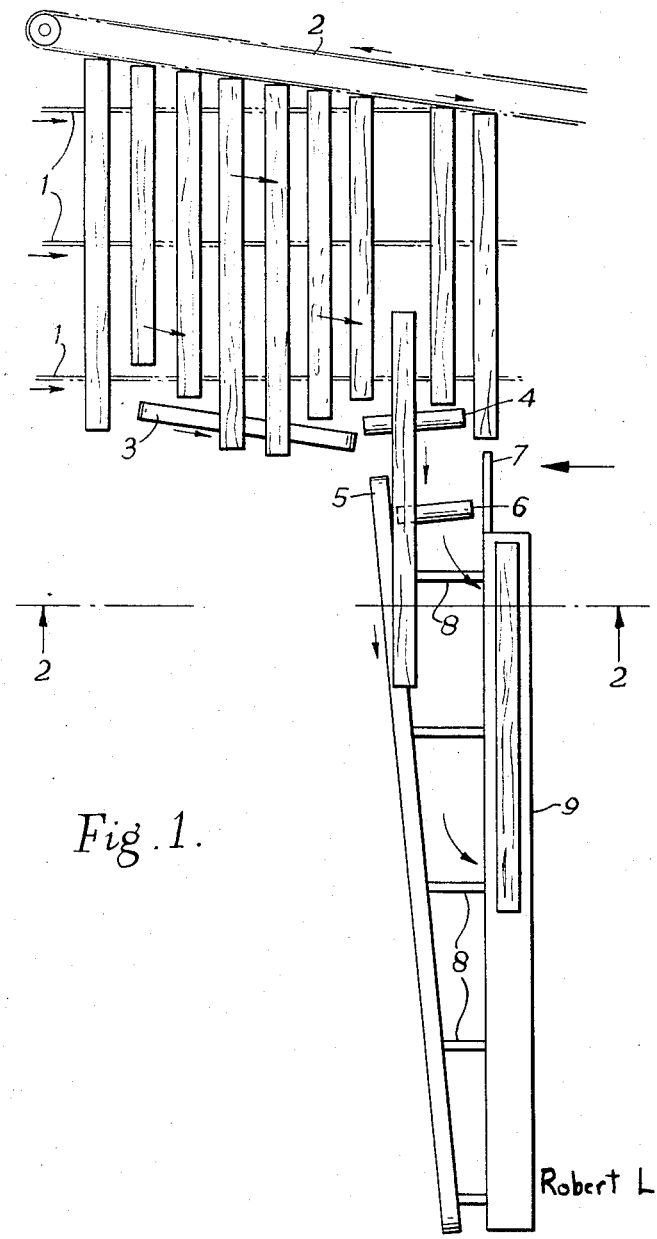
Figure 1 is a plan view of a part of the apparatus.

In the drawings there is shown only a portion of the main chain conveyor on which the timber planks are carried and only a single plank ejecting station is shown for withdrawing planks lying in a given range of sizes from the timber carried on the conveyor. However, the ejecting means at all the stations are constructed in the same manner.

In the construction shown the planks are carried forwardly by means of a chain conveyor 1, the chains of which are of the type having rollers carried by the links, which has been referred to above, so that planks can be moved laterally of the chains quite easily.

Planks are guided slowly laterally of the conveyor 1 by means of a second chain conveyor 2 running just above the conveyor 1 and obliquely across it. The conveyor 2 moves slightly faster than the conveyor 1, so as to have a component of motion lengthwise of the conveyor equal to the speed of the conveyor 1.

Along the length of the conveyor 1 a number of ejector stations are arranged (preferably in a row parallel with the direction of the conveyor 1), at which those planks whose ends project by more than a predetermined amount from the edge of the conveyor 1, are withdrawn laterally from the conveyor. The length of the planks thus withdrawn decreases at each ejector station, as the planks are moved laterally off the conveyor 1 by the conveyor 2.

At each ejector station there is a lift conveyor 3 arranged beside the main conveyor 1 and moving at substantially the same speed. As can be seen from Figure 2 the lift conveyor 3 is slightly inclined vertically in relation to the main conveyor 1, so as to lift those planks, whose ends project over it and is substantially parallel to the guide conveyor 2 in the horizontal direction.

When the planks leave the end of the lift conveyor 3, they are dropped onto a rapidly rotating rubber (or other friction material) covered roller 4, whose axis is inclined in relation to the direction of movement of the conveyor 1 and this gives the planks an initial lateral acceleration to overcome inertia and bring the projecting ends of the planks onto a take-off conveyor 5, which moves at a speed such that its component of motion lengthwise of the conveyor 1 is substantially equal to the speed of that conveyor.

The rubber roller 4 is above the level of the conveyor 1 by an amount such that the projecting planks can pass underneath it.

In practice the main conveyor 1 travels at a speed of about 20 feet per minute, whilst the take-off conveyor 5, which is a steel slat conveyor, travels at a speed of about 80 feet per minute and is arranged at the appropriate angle to the conveyor 1 to impart of about 20 feet per minute to the end of a plank supported on the take-off conveyor 5.

As a plank is withdrawn completely from the conveyor 1, its rear end first comes onto the rubber roller 4 and then falls onto an idler roller 6 beside which a skid board 7 is arranged. When the take-off conveyor 5 draws the plank off the idler roller 6, it falls onto a series of inclined rails 8, down which it slides to a platform 9 on which a set of planks is gradually built up.

In a modified construction in which a main conveyor having cleated chains is employed, the lift conveyor 3 and the inclined guide conveyor 2 are replaced by stationary members, since the cleats on the conveyor chains prevent the planks from sliding lengthwise of the main conveyor. Thus the lift conveyor is replaced by an inclined ramp and the inclined guide conveyor is replaced by a skid board, likewise inclined to the direction of the conveyor. Such skid board may be of constant inclination or may alternatively be stepped so as to have some inclined portions and some portions parallel with the main conveyor.

Where a cleated conveyor chain is employed, the rubber roller 4 and take-off conveyor 5 will preferably be arranged so as to move the projecting end of the plank in the forward direction slightly more quickly than the main conveyor so as to separate the plank at this end from the cleats and thus facilitate its movement laterally of the main conveyor.

In constructions employing either sort of main conveyor chain, it is possible for the take-off conveyor to be replaced by series of idler power-driven rollers or a combination of idler and power-driven rollers.

Where the apparatus above described is used for the semi-automatic removal of planks which are of a quality different from the bulk of the planks on the conveyor, this task is carried out under the control of an operator, who selects such planks for removal. The selection is carried out at an ejector station at which the planks arrive before reaching the first length-sorting ejector station. The selection is carried out by moving the selected boards laterally of the main conveyor by a distance sufficient to make an end project for engagement by the lift conveyor or ramp. The lift conveyor at such station may be parallel with the main conveyor.

In another alternative construction, one end of the planks is guided by a guide rail which runs parallel with the main conveyor and the distance between the guide rail and the lift conveyor or ramp is decreased at each successive station. In order to be able to do this and at the same time to have a main conveyor capable of conveying both long and short planks, the conveyor narrows towards its discharge end. This may be achieved by mounting the conveyor chains on longitudinally spaced end sprockets, so that the number of chains and therefore the width of the conveyor decreases. An ejector station may be arranged at the end of each main conveyor chain or at intermediate points, the ejector means at each successive station being positioned nearer to the guide rail than at the previous station so that shorter planks are withdrawn at each successive station.

I claim:

1. Apparatus for sorting planks comprising a main conveyor on which the planks are carried breadthwise and ejecting means arranged beside the main conveyor, said ejecting means comprising a means for engaging and raising the end of those planks on the main conveyor which, on arrival at the ejecting means, project laterally from the main conveyor by more than a predetermined amount, and a lateral conveying means arranged at a higher level than the main conveyor and positioned to receive the raised end of a plank from the engaging and raising means and to move such plank laterally of the main conveyor, said lateral conveying means being arranged to give the plank a component of motion lengthwise of the main conveyor substantially equal to the speed of the main conveyor.

2. Apparatus for sorting planks according to length comprising a main conveyor on which the planks are carried breadthwise, a guide means for engaging one end of the planks on the main conveyor, ejecting means arranged beside the main conveyor at a plurality of stations, the gap between the ejecting means and the guide means decreasing at each successive station, each ejecting means comprising a means for engaging and raising the end of those planks on the main conveyor which, on arrival at the ejecting station, project laterally from the main conveyor by more than a predetermined amount, and a lateral conveying means arranged at a higher level than the main conveyor and positioned to receive the raised end of a plank from the engaging and raising means and to move such plank laterally of the main conveyor, said lateral conveying means being arranged to give the plank a component of motion lengthwise of the main conveyor substantially equal to the speed of the main conveyor.

3. Apparatus for sorting planks according to claim 2 wherein the means for engaging and raising the projecting end of a plank comprises a conveyor arranged beside the main conveyor and slightly vertically inclined in relation thereto.

4. Apparatus for sorting planks according to claim 2 wherein the guide means extends over the top of the conveyor, said guide means being inclined horizontally in relation to the main conveyor to produce movement of the planks laterally of the main conveyor.

5. Apparatus for sorting planks according to claim 2 wherein the lateral conveying means of an ejecting means comprises a conveyor extending transversely at a large angle in relation to the main conveyor.

6. Apparatus for sorting planks according to claim 2 wherein a driven roller is located beside the main conveyor at each ejecting station to receive the raised end of a plank from the engaging and raising means to impart an acceleration to the plank in a direction transverse to the direction of the conveyor motion.

References Cited in the file of this patent

UNITED STATES PATENTS

| | | |
|---|---|---|
| 964,670 | Moncreiffe | July 19, 1910 |
| 2,038,362 | Hutchinson | Apr. 21, 1936 |
| 2,187,101 | Schneider | Jan. 16, 1940 |